Feb. 14, 1939.  J. E. GALLAHER  2,147,434
APPARATUS FOR REPRODUCING CONGRUENT IMAGES OF ONE-SHOT FILMS
Filed April 28, 1936  3 Sheets-Sheet 1
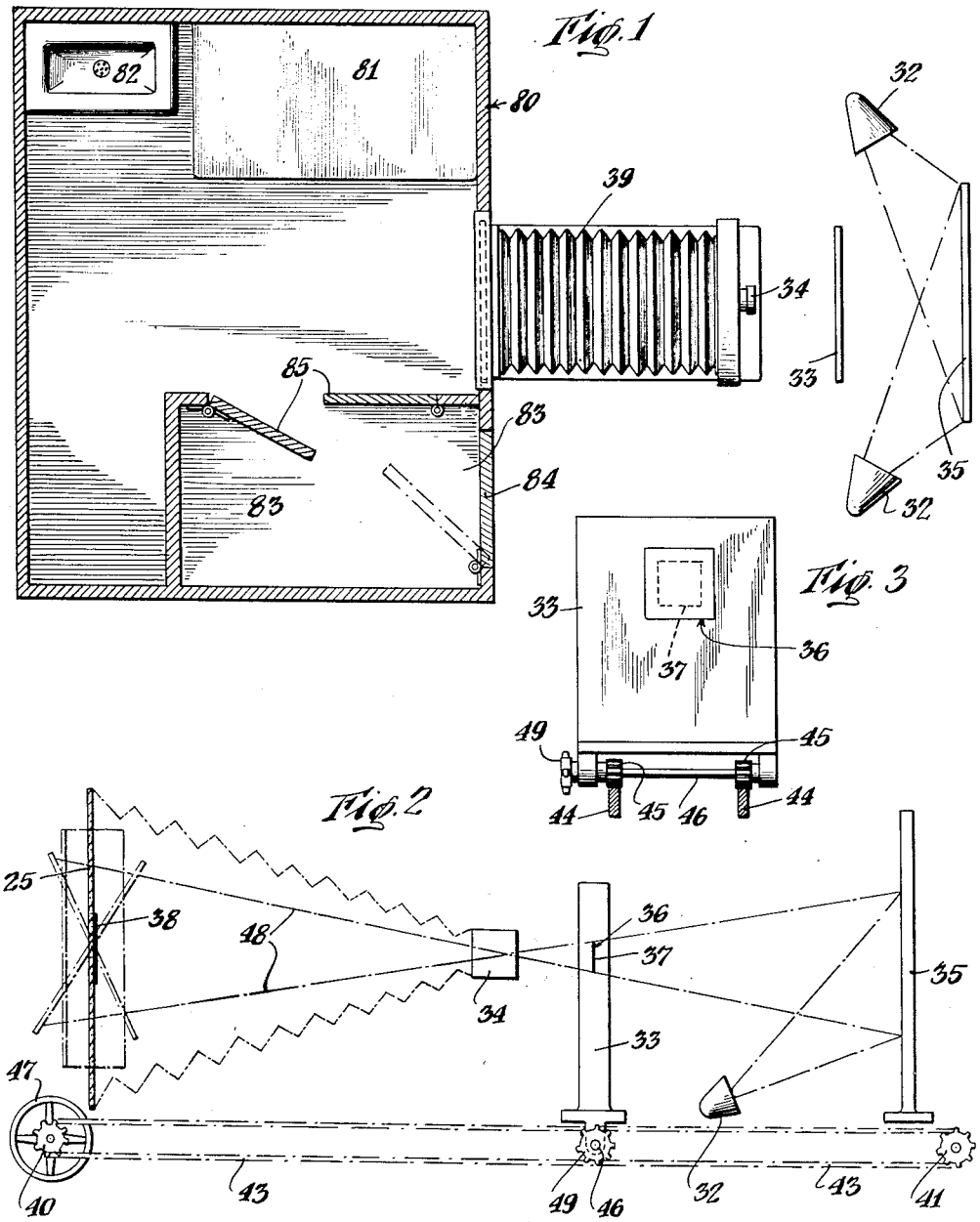
INVENTOR
Joseph Edward Gallaher
BY
Charles A. Morton
ATTORNEY Feb. 14, 1939.    J. E. GALLAHER    2,147,434
APPARATUS FOR REPRODUCING CONGRUENT IMAGES OF ONE-SHOT FILMS
Filed April 28, 1936    3 Sheets-Sheet 2
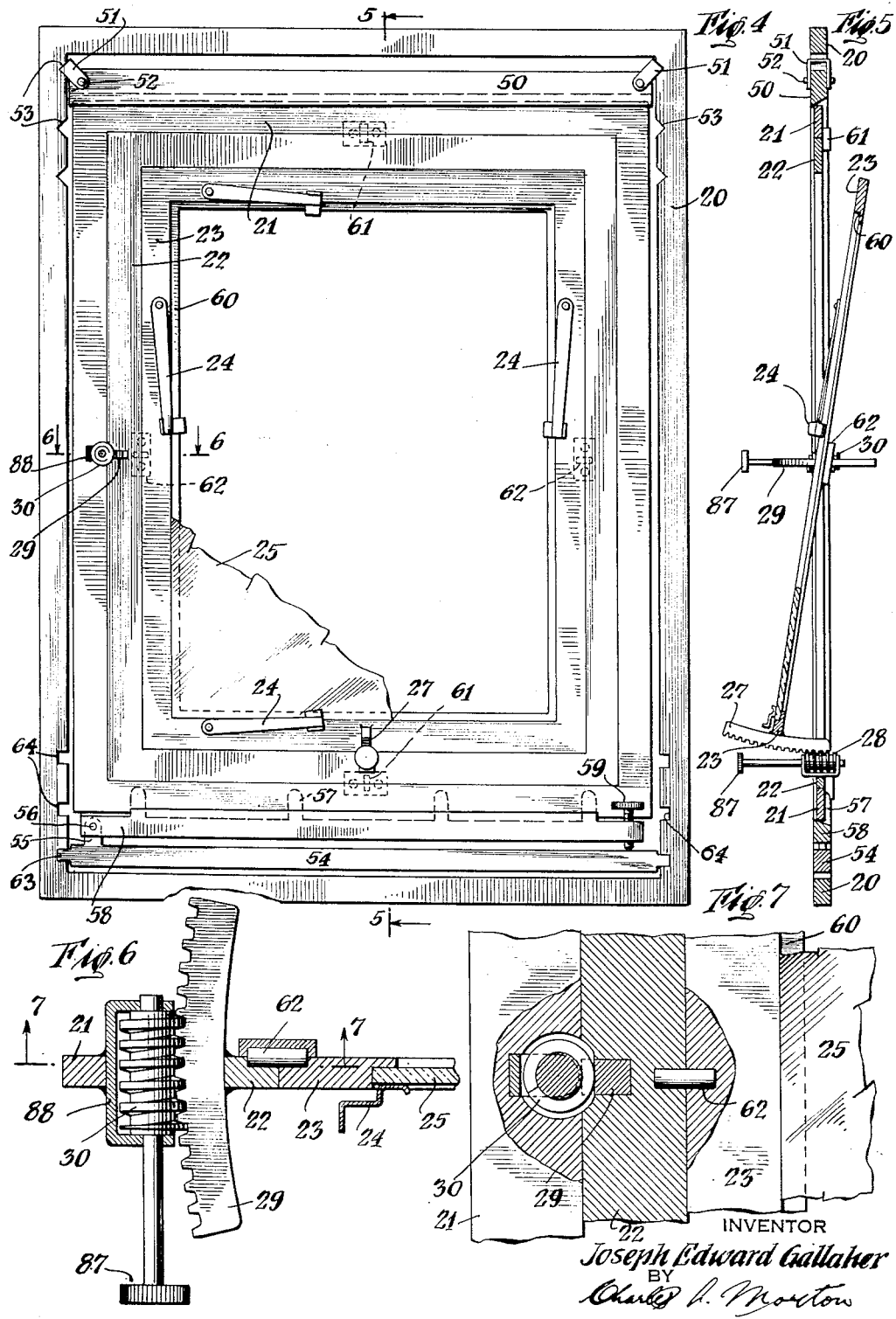
INVENTOR
Joseph Edward Gallaher
BY
Charles L. Morton
ATTORNEY Feb. 14, 1939.  J. E. GALLAHER  2,147,434
APPARATUS FOR REPRODUCING CONGRUENT IMAGES OF ONE-SHOT FILMS
Filed April 28, 1936   3 Sheets-Sheet 3
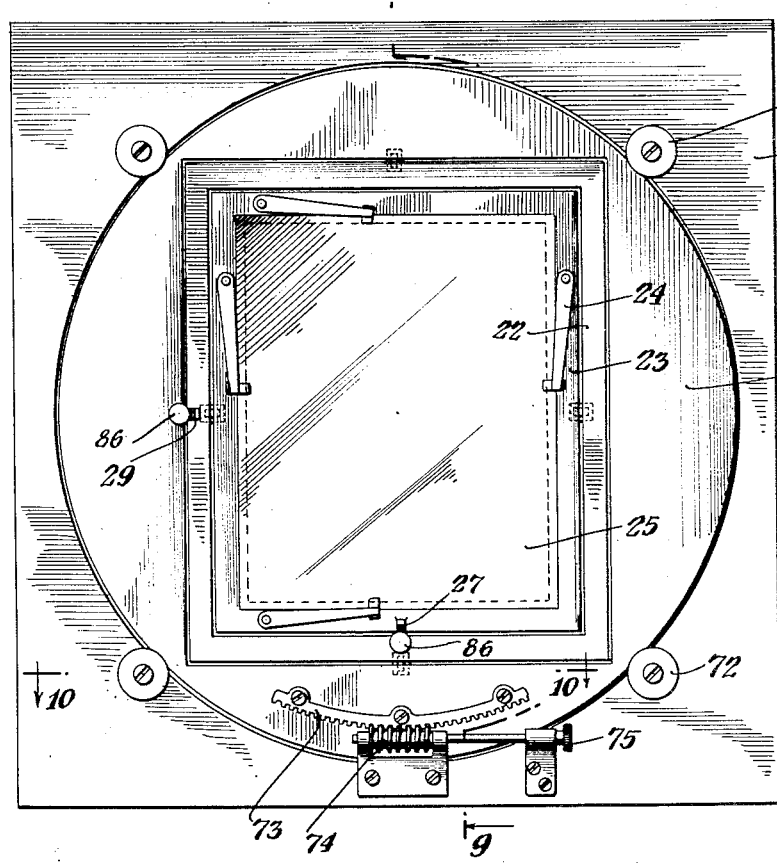
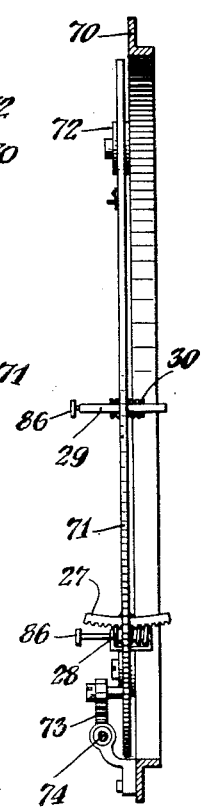
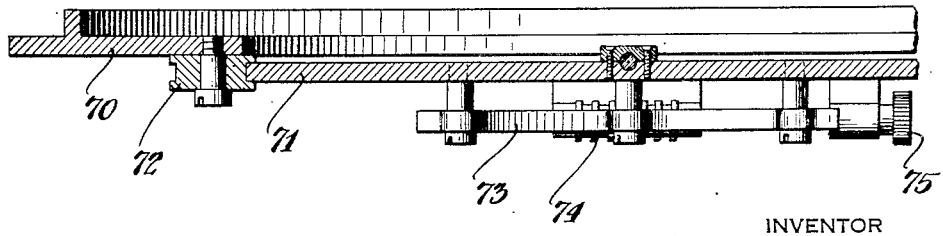
INVENTOR
Joseph Edward Gallaher
BY
Charles A. Morton
ATTORNEY Patented Feb. 14, 1939

2,147,434

UNITED STATES PATENT OFFICE 2,147,434

APPARATUS FOR REPRODUCING CONGRUENT IMAGES OF ONE-SHOT FILMS

Joseph Edward Gallaher, Baldwin, N. Y.

Application April 28, 1936, Serial No. 76,726

6 Claims. (Cl. 88—24)

This invention relates to an apparatus for reproducing congruent images of one-shot films.

One of the difficulties encountered in making direct photo-color separations or direct color negatives with a one-shot camera is the failure of all three negatives to register exactly. This failure to effect absolute registry may be due to various causes, and regardless of the degree of care exercised in constructing the one-shot camera or in loading the same the direct photo-color separations or direct color negatives made by a single shot, frequently fail to effect absolute registry, when superimposed one above the other. The enlarged positives reproduced from said negatives preparatory to making half-tone plates or color prints, will magnify any error in the original negatives due to absence of absolute registry, many times, so that the disalignment of the images upon the half-tone plates, or bromide prints, is quite obvious to the naked eye, and must be corrected. It is customary to try and overcome this lack of registry of the half-tone plates by hand engraving, but the process is slow, expensive and inaccurate.

One object of this invention is an apparatus for reproducing congruent images of one-shot films.

Another object is to correct for errors in direct photo color separations or direct color negatives of the one-shot type.

Another object is the faithful reproduction in color and without distortion, of the subject originally photographed with a one-shot camera.

Other objects are economy of time, labor and reduction of production cost.

Other objects will appear from the detailed description which follows.

In accordance with this invention a positive is first made from one of the direct color-photo-separations or direct color-separation negatives. After the positive has been developed, it is restored to its original position in the camera, and one of the remaining direct color-separation negatives is substituted for the negative from which said positive was made, and the image projected upon the positive by the substitute negative is observed and any absence of registry noted. Either the negative or the positive is now turned until the image projected upon the positive by the substitute negative, and the real image (previously recorded) upon said positive, are congruent. The positive is thereupon replaced by a photographic plate, or by sensitized paper, and the image projected by said substitute negative is recorded and developed. The process is thereafter repeated with the remaining direct color-separation negatives, and the images thus photographically recorded upon the several positives, will, when superimposed one above the other, be in absolute registry or congruence.

To assure congruence of the real and projected images, it is desirable to scan said images through a magnifying glass, particularly where the positives are too small to justify reliance upon the naked eye alone. When the positives made from the direct color-separation negatives are suitably enlarged to bring out the detail work clearly, the magnifying glass may be discarded, as the naked eye will then ordinarily disclose any absence of registry.

The use of the process is also greatly facilitated by making an extra positive of the first direct color-separation negative, and coating the same with ground glass solution to make a ground glass positive, or an enlarged ground glass positive, as the case may be, and projecting the images of the other direct color-separation negatives upon the real image recorded on said ground glass positive, to determine the plane of absolute registry or congruence.

In the drawings comprising three sheets of ten figures numbered Figs. 1 to 10 inclusive, one embodiment of my method and one form of apparatus for carrying out the said method are illustrated.

Fig. 1 is a general plan view partly in section showing the photographic camera and associated dark room.

Fig. 2 is a diagrammatic representation of the apparatus for accomplishing my said method.

Fig. 3 is a front view of the copy rack.

Fig. 4 is a front view of one form of apparatus suitable for carrying out by said method assembled in association with a camera plate holder.

Fig. 5 is a vertical sectional view taken along the line 5—5 of Fig. 4 looking in the direction of the arrows.

Fig. 6 is a horizontal sectional view taken along the line 6—6 of Fig. 4 looking in the direction of the arrows.

Fig. 7 is a vertical sectional view taken along the line 7—7 of Fig. 6 looking in the direction of the arrows.

Fig. 8 is a front view of another form of apparatus suitable for carrying out my said method, assembled in association with a camera plate holder.

Fig. 9 is a vertical sectional view taken along the line 9—9 of Fig. 8 looking in the direction of the arrows; and Fig. 10 is a horizontal sectional view taken along the line 10—10 of Fig. 8 looking in the direction of the arrows.

Like reference characters designate corresponding parts throughout the several figures of the drawings.

For convenience the camera bellows 39 (Fig. 1) is used in association with a dark room 80, so that the plate holder 20 (Fig. 4) secured to the open end of the camera bellows 39, is positioned inside dark room 80. The dark room is preferably provided with an ante-chamber or vestibule 83, having an outer door 84, and an inner door 85. It may also be equipped with a suitable table or bench 81 and sink 82.

An adjustable copy rack 33 is placed in front of the lens 34. Rack 33 is provided with a suitable opening for receiving a photographic negative 36, said negative being any one of a series of interchangeable direct color-photo-separations or direct color-separation negatives, whereon a picture 37 has been photographically recorded by means of a one-shot camera. Light from a series of flood lights 32 is reflected through negative 36 and picture 37 by means of a reflecting screen 35. After passing through the picture 37, the light rays are focused by means of lens 34 upon light sensitive recording paper, a plate, or a ground glass, 25 (Fig. 4), secured in plate holder 20, by means of my photodistortion rectifying apparatus hereinafter more fully described. Copy rack 33 is adjusted relative to lens 34 and reflecting screen 35 in any preferred manner, as for example by means of endless chain 43 passing around sprocket 40 positioned adjacent the plate holder 20, around sprocket 41 positioned at the other end of the screen bed, and over sprocket 49 secured to shaft 46, journalled in suitable bearings at the base of copy rack 33. Gears 45—45 mounted on shaft 46, engage with toothed racks 44—44, which constitute a track or bed whereupon copy rack 33 is bodily movable under control of manually operated adjusting wheel 47 to vary the position of the copy rack relative to lens 34 and reflecting screen 35 thus facilitating correct focusing. The band of light rays constituting beam 48—48, will be projected upon the device 25, which may be a light sensitive recording paper, a plate, or a ground glass, and the picture recorded upon negative 36 (preferably enlarged) will be visible at 38, upon ground glass 25, or photographically recordable upon a plate or light sensitive paper.

The camera bellows 39 may be provided with any conventional form of plate holder. One such form is shown at 20 in Fig. 4, and another form is shown at 70, 71, in Fig. 8.

Referring to Figs. 4 to 7, plate holder 20 is grooved at 64—64, to receive the tongues 63—63 of the lower adjustable member 54. Lower bevelled trough 58, is pivoted at 56 to ear 55 of member 54. By operating adjusting screw 59, the image 38 projected on the plate or ground glass 25, may where necessary be brought into proper horizontal and vertical alignment. Upper bevelled trough 50, is also adjustable to receive photographic plates of different sizes. This is accomplished by means of the several pairs of notches 53—53, which are adapted to receive catches 51—51, which are pivoted at 52—52 to trough 50. The bevelled edges of troughs 58 and 50 prevent a photographic plate or other article held therebetween from falling out of holder 20, while retaining clips 57—57 may be secured adjacent the diverging edges of said bevels to prevent a plate from falling out of the holder into the camera bellows. See for example the clips 57 secured to lower bevelled trough 58 as shown in Fig. 5.

My photo-distortion rectifying apparatus may be employed with a camera having a plate holder of the character illustrated in Figs. 4 and 5 last described. Said apparatus may consist of a stationary frame 21, a turning frame 22 and a tilting frame 23. Stationary frame 21 is held in plate holder 20, between the bevelled edges of troughs 58 and 50 and by the cooperation of the clips 57—57. While in the drawings the clips 57 are only shown attached to lower trough 58, it should be understood that similar clips may be likewise attached to the upper trough 50. Turning frame 22 is pivoted to stationary frame 21 at 61—61, so that by turning frame 22 about pivots 61—61, its direction relative to the direction of stationary frame 21 and copy rack 33 may be changed from one of horizontal parallelism to some other direction converging therewith. The degree of angular change in direction or turning movement may be regulated at will by set screw 87 (Fig. 6), which operates worm 30 in the curved rack 29 forming an integral part of frame 22, to turn frame 22 in the manner previously described. Worm 30 and rack 29 may be precision mechanism and so graduated as to provide a micrometer adjustment between stationary frame 21 and turning frame 22, and said worm and rack will retain frames 21 and 22 locked in any particular setting selected by the operator until said screw 87 is operated to turn worm 30 in yoke 88 to change said setting.

Similarly tilting frame 23 is pivoted to turning frame 22 at 62—62, so that its vertical plane with respect to copy rack 33 may be changed from one of vertical parallelism with the plane of the copy rack 33 and negative 36 to some other plane converging therewith. The degree of angular tilting movement may be regulated at will by turning said screw 87 thereby operating worm 28 in curved rack 27 which forms an integral part of frame 23, to tilt frame 23 relative to frame 22 and consequently relative to frame 21 also, as previously described.

The inner wall of tilting frame 23 is rabbetted at 60 (Figs. 4 and 7) to provide a shoulder for receiving and holding the photographic plate, the light sensitive recording paper, or the ground glass, 25. A series of spring clips 24—24 are pivotally secured to frame 23, and are adapted to press against the peripheral edges of plate 25 to retain said plate in position against the rabbetted edge 60 of tilting frame 23.

When the camera is not equipped with an adjustable plate holder mechanism of the character illustrated generally in Figs. 4 and 5, it may be advisable to embody my invention in a plate holder unit as illustrated in Figs. 8 and 9. In the latter figures, plate holder 20 and my stationary frame 21 are replaced by stationary frame 70 and rotating frame 71. The turning frame 22 may be pivoted upon a pair of vertically mounted pivots, in the circular rotating frame 71. Its turning movement may be controlled by a worm 30 and curved rack 29 in the manner previously described for Figs. 4 and 5. It will be observed that frame 71 is rotatably mounted between a series of rollers 72—72, so that frame 71 is thus rockably supported by stationary frame 70. The edge of frame 71 and the channels in rollers 72 may be correspondingly bevelled and counter bevelled. The degree of rocking movement of frame 71 relative to frame 70 is controlled by a curved rack 13 mounted on the former, and a worm 14 journalled to the latter, said worm being operated by a set screw 15. Tilting frame 23 is horizontally pivoted in turning frame 22 upon a pair of horizontal pivots. The tilting movement of frame 23 relative to frame 22 is controlled by worm 26 and curved rack 27 in the manner previously described.

One method of reproducing congruent images of one-shot films by means of my photo-distortion rectifying apparatus will be described by referring to Fig. 2 in conjunction either with the apparatus shown in Figs. 4 and 5, or with that shown in Figs. 8 and 9. Any one of a series of interchangeable direct photo-color separations 36, whereon a picture 37 has been recorded by means of a one-shot camera, is inserted in copy rack 33, and by manipulating adjusting wheel 47, camera bellows 39, lens 34, and screen 35, beam 48—48, is projected to bring the enlarged image 38 into correct focus upon a ground glass 25 secured in tilting frame 23. For this operation it will be assumed that turning frame 22 and tilting frame 23 are in horizontal and vertical parallelism with plate holder 20, copy rack 33 and direct photo-color separation or direct color negative 36. Without any change in the setting of the frames, a photographic plate is now substituted for the ground glass 25, and the projected image of the picture 37 suitably enlarged at 38 upon said photographic plate is photographically recorded. Without changing the setting of the frames the exposed plate is then removed from frame 23 and replaced by a second photographic plate (if a half-tone plate is to be made therefrom), or by bromide paper (if a bromide print for a color printing process is to be produced), and the image 38 is again photographically recorded. The photographic plate is now developed sufficiently to make a half developed positive, and after drying the plate is treated with a ground glass solution and re-dried to make, in effect, a ground glass positive. Said ground glass positive is then reinserted in frame 23, and the direct color photo negative or direct photo-color separation 36 is removed from copy rack 33 and is replaced by another negative 36 of the same series of one-shot negatives. The picture 37 recorded upon said second negative will be projected upon the ground glass positive, and if the picture 37 recorded upon the first negative 36, and the picture 37 recorded upon the second negative 36 are free from relative distortion, the enlarged image of picture 37 of said second negative as projected and superimposed upon the recorded image 38 of the ground glass positive will be congruent and form in effect a single composited image consisting of the enlarged image of the first picture 37 photographically recorded on the ground glass positive, and the image projected thereon by the enlargement of the picture 37 of the second negative 36. If there is any relative distortion of the pictures 37 recorded on the first and second negatives 36, the enlargement of the image of picture 37 of said negative as projected and superimposed upon the image photographically recorded upon the ground glass positive will be apparent at once, because the fixed and projected images will not be congruent, but will appear as two distinct outlines producing a blurred composited image. Dependent upon the location of any double lines disclosed by the composited image, the operator will manipulate one, or the other (or both) set screws 87, thus turning frame 22 and consequently frame 23, or tilting frame 23, or turning frame 22 and tilting frame 23, in the beam 48 (Fig. 2) until the lines of the projected image of picture 37 coincide with the lines of the fixed image recorded on ground glass 25, whereupon the two images will be congruent, so that the composited image is but a single outline and therefore clear and unblurred. Positive 25 is again removed from plate 23 and an un-exposed plate or sheet of bromide paper is substituted therefor, and the corrected image is photographically recorded at 38 (Fig. 2). Said exposed plate or bromide paper is then removed from frame 23.

The ground glass positive 25 is again reinserted in frame 23, the second negative 36 of the series is removed from copy rack 33 and is replaced by the third negative 36 of the same series of direct color-separation negatives, and the process of manipulating set screws 87 to vary the position of frame 23 in the beam 48 to produce a distortionless composited image is repeated. Positive 25 is then removed from frame 23 and replaced by an unexposed plate or sheet of bromide paper; the corrected image of the third direct color-separation negative 36, is photographicaly recorded; and the exposed plate or bromide paper removed from frame 23 in the manner previously described.

While enlarging the projected images of the negatives magnifies any relative distortion existing between the images recorded on said negatives, making any distortion more readily distinguishable, enlarging may be omitted if desired. A ground glass positive facilitates the practice of the method, but the same ultimate result can be obtained by using the positive reproduced from the first negative of the series, as a basis of comparison.

The three positives are developed and superimposed one above the other. It will be observed that their respective images are congruent, and differ in intensity only according to the degree of light and shadow indicative of the presence or absence of particular primary color groups in the direct photo-color separations 36. If the positives are photographic plates, half-tone plates having congruent images for correctly reproducing the recorded colors may be made therefrom in the well known manner. If the positives are bromide prints, color prints may be produced therefrom by any preferred process of color printing such as the "Carbro process." My said process may likewise be employed for making color transparencies.

It should be understood that while in describing my said process the ground glass positive 25 and frame 23 have been turned and tilted in beam 48 to effect rectification of any distortion between the pictures recorded on the direct photo-color separations 36, which have been described as retained in fixed position in adjustable copy rack 33; said process may be carried out by turning and tilting the direct photo-color separations 36 while retaining the ground glass positive 25 and plate holder 20 in fixed position. Such an arrangement is a mere reversal and contemplates the use of an apparatus similar to frames 22 and 23 in association with adjustable copy rack 33. In either case the principle of operation is the same to wit: varying the position of one of said photographically recorded pictures with respect to the other until the enlarged image of the direct photo-color separation projected upon the ground glass positive is congruent with the image recorded upon said ground glass positive 25.

The direct color-separation negatives 36, may if preferred be held in copy rack 33 between two clean pieces of glass, (not shown).

Similarly when making bromide prints, bromide paper is preferably clamped in frame 23 by spring clips 24—24, between two sheets of clear glass. If this procedure is adopted a sheet of clear glass should also be inserted in frame 23 in front of the ground glass for focusing purposes, and for making a ground glass positive, if the same is used.

Coating the back of the bromide paper with shellac, or mounting it with rubber cement upon a sheet of thin aluminum, prevents the back of the bromide paper from getting wet, and helps to overcome any tendency of the bromide paper to change in size due to stretching or shrinking.

It is obvious that my process may be used in conjunction with my light sensitive surface including the wet plate, dry plate, film, collodion coated plate, and photographic printing paper.

Other modifications and variations of my herein described process will suggest themselves to those skilled in the art.

I claim:

1. A portable photo-distortion rectifier adapter unit detachably attachable in the conventional plate holder of a camera casing comprising in combination, a yoke adjustably seatable in the plate holder opening so as to lie within the normal plane of said plate holder, an outer frame nesting in said yoke, an inner frame nesting in said outer frame, said inner frame being adapted to accommodate a conventional camera plate, one of said frames being horizontally pivotally mounted for turning movement relative to the normal plane of the plate holder, and the other of said frames being vertically pivotally mounted for tilting movement relative to the normal plane of the plate holder and at right angles to the pivotal axis of its associated frame whereby the inner frame may be turned and tilted at will relative to the plane of the plate holder.

2. A portable photo-distortion rectifier adapter unit detachably attachable in the conventional plate holder of a camera casing comprising in combination, a yoke adjustably seatable in the plate holder opening so as to lie at all times within the normal plane thereof, an outer frame nesting in said yoke, an inner frame nesting in said outer frame, said inner frame being adapted to accommodate a photographic plate of conventional size, one of said frames being horizontally pivotally mounted for turning movement relative to the normal plane of the plate holder, means for adjustably regulating the degree of turning movement of said frame, the other of said frames being vertically pivotally mounted for tilting movement relative to the normal plane of the plate holder and at right angles to the pivotal axis of its associated frame, and means for adjustably regulating the degree of movement of said tiltable frame.

3. A portable photo-distortion rectifier adapter unit detachably attachable in the conventional plate holder of a camera casing comprising in combination, a yoke adjustably seatable in the plate holder opening so as to lie within the normal plane of said plate holder, an outer frame nesting in said yoke, an inner frame nesting in said outer frame, said inner frame being adapted to accommodate a conventional plate normally usable in conjunction with said camera, means for retaining said plate in said inner frame, means for horizontally pivotally mounting one of said frames to effect turning movement of said frame relative to the normal plane of the camera plate holder, and means for vertically pivotally mounting the other frame to effect tilting movement of said frame relative to the normal plane of the camera plate holder.

4. A portable photo-distortion rectifier adapter unit detachably attachable in the conventional plate holder of a camera casing comprising in combination, a yoke adjustably seatable in the plate holder opening so as to lie within the normal plane of said plate holder, an outer frame nesting in said yoke, an inner frame nesting in said outer frame, said inner frame being adapted to accommodate a conventional plate normally usable in conjunction with said camera, means for retaining said plate in said inner frame, means for horizontally pivotally mounting one of said frames to effect turning movement of said frame relative to the normal plane of the camera plate holder, means for adjustably regulating the degree of turning movement, and means for vertically pivotally mounting the other frame to effect tilting movement of said frame relative to the normal plane of the camera plate holder.

5. A portable photo-distortion rectifier adapter unit detachably attachable in the conventional plate holder of a camera casing comprising in combination, a yoke adjustably seatable in the plate holder opening so as to lie within the normal plane of said plate holder, an outer frame nesting in said yoke, an inner frame nesting in said outer frame, said inner frame being adapted to accommodate a conventional plate normally usable in conjunction with said camera, means for retaining said plate in said inner frame, means for horizontally pivotally mounting one of said frames to effect turning movement of said frame about the normal plane of the camera plate holder, means for vertically pivotally mounting the other frame to effect tilting movement of said frame about the normal plane of the camera plate holder, and means for adjustably regulating the degree of tilting movement.

6. A portable photo-distortion rectifier adapter unit detachably attachable in the conventional plate holder of a camera casing comprising in combination, a yoke adjustably seatable in the plate holder opening so as to lie within the normal plane of said plate holder, an outer frame nesting in said yoke, an inner frame nesting in said outer frame, said inner frame being adapted to accommodate a conventional plate normally used in conjunction with said camera, means for retaining said plate in said inner frame, means for horizontally pivotally mounting one of said frames to effect turning movement of said frame relative to said camera plate holder and the focal plane of the camera lens, means for adjustably regulating the degree of turning movement, means for vertically pivotally mounting the other frame to effect tilting movement relative to said camera plate holder and the focal plane of the camera lens, and means for adjustably regulating the degree of tilting movement.

JOSEPH EDWARD GALLAHER.